Feb. 2, 1971    J. C. MOORE    3,560,019
SHOCK CUSHIONING MOUNTING MEANS FOR CANOPIES ON HEAVY EQUIPMENT
Filed May 22, 1969    2 Sheets-Sheet 2

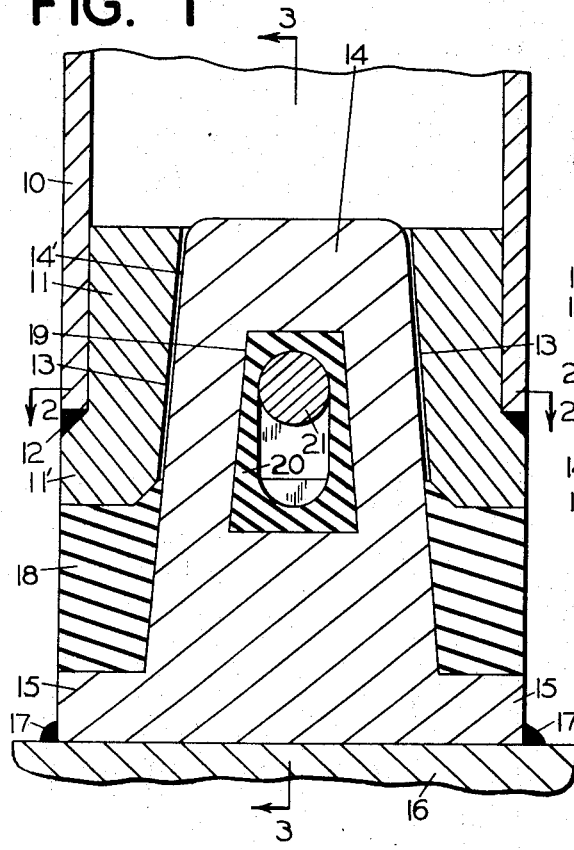

JAMES C. MOORE
INVENTOR

BY *T.R.Geisler*
ATTY.

United States Patent Office 3,560,019
Patented Feb. 2, 1971

1

3,560,019
SHOCK CUSHIONING MOUNTING MEANS FOR CANOPIES ON HEAVY EQUIPMENT
James C. Moore, Portland, Oreg., assignor to Portland Wire & Iron Works, Portland, Oreg., a corporation of Oregon
Filed May 22, 1969, Ser. No. 826,895
Int. Cl. B62 25/06
U.S. Cl. 280—150                                    6 Claims

ABSTRACT OF THE DISCLOSURE

A mount including cooperating portions, one a bayonet member with a protruding body of decreasing cross-sectional area and the other a sleeve member having a correspondingly decreasing internal cross-sectional area capable of receiving the bayonet body in a close fit; one portion secured to the bottom of the canopy post and the other portion secured to the vehicle; a cushioning element normally maintaining a slight overall clearance between bayonet body and the surrounding sleeve wall; and locking means preventing any greater separation between bayonet body and sleeve than normally caused by the cushioning element.

BACKGROUND OF THE INVENTION

Guard canopies are customarily installed on such vehicles as tractors and heavy ground-working equipment in order to provide protection to the operator against falling timbers, trees, etc., especially protection in the event the vehicle should overturn. Such canopies include strong, rigid steel frames having four or more posts, generally of tubular construction in order to provide maximum strength and rigidity for the amount of metal used, with means for securing the bottoms of the posts to the vehicle body.

In the past such guard canopies were generally secured to the vehicle by substantially rigid metal mounting means. U.S. Pat. No. 2,805,887, issued under date of Sept. 10, 1957, shows mounting means of this nature used for securing a guard canopy on a tractor. However, it has been found that, with the employment of rigid unyielding mounting means, the vibrations and shocks which are transmitted to the canopy thereby, and the strains on the canopy structure resulting from the slight relative movements which will occur in the frame of the vehicle in passing over rough ground and in encountering obstacles, in addition to direct shocks received by the canopy, result in frequent failures in such mounting means and in the welding and also produce more fatigue in the canopy structure itself.

A subsequently developed canopy mount described in U.S. Pat. No. 3,036,858, issued under date of May 29, 1962, sought to solve this problem by providing a flexible cushioning element in the means connecting the bottom of the canopy post with its mounting support on the vehicle. However, this improved canopy mounting means not only permits excessive flexing between canopy and vehicle to take place, even under normal conditions, but also has the objectionable feature that deterioration and failure in the cushioning element will render this mounting means completely unable to function in any satisfactory manner.

The object of the present invention is to provide further improved mounting means for guard canopies which at best will never permit more than very restricted flexing between canopy and vehicle to occur, which mounting means under normal operation and condition of use will enable vibrations and shocks imparted from the vehicle to be absorbed or dampened in transmission to the canopy through the medium of a cushioning element in the mounting means, but which mounting means will not be incapable of functioning in a fairly satisfactory manner even though the cushioning element fails to perform its function.

SUMMARY OF THE INVENTION

In its preferred form the device of the invention includes a metal sleeve element, having an upper portion with external dimension corresponding to the internal dimension of the tubular post for the canopy, which upper portion is firmly secured in the bottom end of the post, and a lower portion of greater external size. The cross sectional dimension of the internal channel in the sleeve decreases constantly upwardly. A cooperating mount for the sleeve and therewith for the post, consists of a metal block or bayonet which is secured to the vehicle, the protruding body of which extends upwardly with its external cross sectional dimension decreasing to correspond to the channel in the sleeve member. The bayonet has an enlarged base or bottom flange which supports a cushioning element. This cushioning element extends around the lower portion of the bayonet and in turn provides the support rest for the sleeve, the height of the cushioning element being such that, under normal conditions, there will be no actual metal-to-metal contact between the bayonet and the sleeve but instead there will be a slight all around clearance between the bayonet and the sleeve channel wall. However, exceptional compression of the cushioning element will result in metal-to-metal contact between sleeve and bayonet which contact limits the possible relative downward movement of the sleeve and canopy post with respect to the bayonet. In order to prevent relative upward movement of the sleeve and canopy post with respect to the bayonet, in the preferred form of the device, the bayonet has a cross slot through which a bolt extends, the bolt being secured at its ends in the corresponding pair of opposed side walls of the sleeve and post. A cushioning lining in the bayonet cross slot prevents metal-to-metal contact between the bolt and the surrounding wall in the bayonet, thus protecting the bolt from wear as well as cushioning any shock which might be transmitted between bayonet and bolt. While the horizontal width of this cushioned slot in the bayonet corresponds to the diameter of the bolt, the up and down length of the cushion slot is greater than the diameter of the bolt in order to accommodate the relative downward movement of sleeve and post with respect to the bayonet upon excessive compression of the main cushioning element.

BRIEF DESCRIPTION OF THE DRAWINGS

In the accompanying drawings, in which FIGS. 1, 2 and 3 illustrate the preferred form of the invention:

FIG. 1 is a sectional elevation taken through the center of the canopy post and mounting means, showing the members of the assembly in the normal position;

FIG. 2 is a cross section on line 2—2 of FIG. 1;

FIG. 3 is a sectional elevation taken on lines 3—3 of FIGS. 1 and 2 and thus taken on a plane normal to the plane of the sectional elevation of FIG. 1;

FIG. 4 is a cross section corresponding to FIG. 2 but showing a slightly modified form of the invention in which the tubular post of the canopy together with the sleeve and bayonet members of the mounting means are circular instead of rectangular in cross section;

Figure 5:
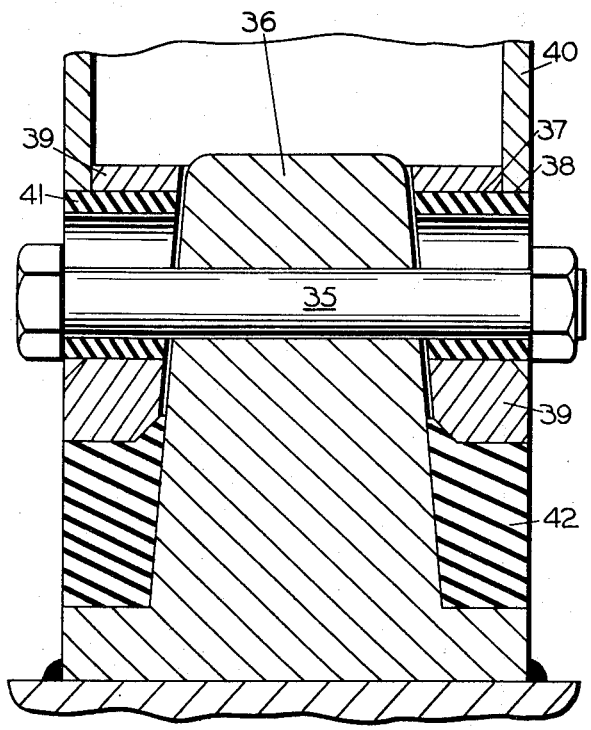
FIG. 5 is a sectional elevation corresponding in part to FIG. 3, but showing another modified construction embodying the invention in which the restraining bolt is firmly mounted in the bayonet and its ends extend through slots in the opposite walls of the sleeve and post.
Figure 6:
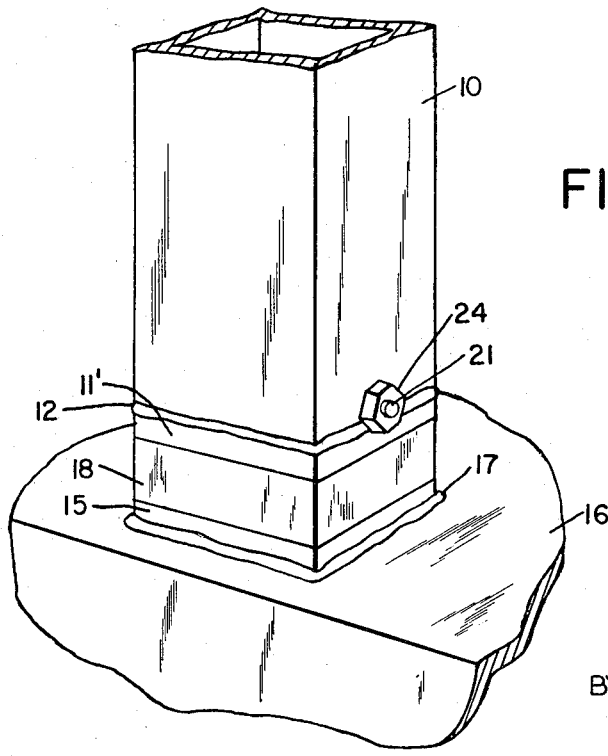
FIG. 6 is a perspective view of the canopy mounting corresponding to FIGS. 1, 2 and 3.

Referring first to FIGS. 1, 2 and 3, the bottom end portion of the tubular post of the canopy is indicated by the reference 10. The canopy itself is not indicated in the drawings since protective canopies of the type with which this invention is concerned are well known and of familiar construction. A metal sleeve, the upper portion 11 of which has an outside dimension corresponding to the inside dimension of the post 10, is firmly secured in the post in any suitable manner, for example by a line of welding indicated at 12. The bottom portion of this sleeve 11 has increased outside periphery indicated at 11'. A channel 13 extends up through the sleeve 11, which channel is of uniformly upwardly decreasing cross-sectional dimension.

A bayonet mount 14, having an enlarged flanged base 15, is rigidly secured to a frame member 16 of the vehicle in any suitable manner, for example by welding as indicated at 17. The bayonet mount has an upwardly protruding body of uniformly decreasing cross-sectional area corresponding to the cross-sectional channel 13 of the sleeve 11, thus making it possible for the sleeve 11 to fit down on the body of the bayonet 14 with a tight fit.

A cushioning member 18, of rubber of other similarly suitable resilient material, extends around the lower portion of the upwardly protruding body of the bayonet mount 14, with the cushioning member resting on the flanged base 15, as shown in FIGS. 1 and 3. This cushioning member 18 is of such height and resiliency that, under the ordinary compression caused by the load and downward thrust exerted through the post 10 and sleeve 11 on the cushioning member 18, the resistance offered by the member 18 will cause a slight all-around clearance, for example a clearance of ⅜ of an inch, to be maintained between the side wall surface 14' on the mount 14 and the wall of the surrounding sleeve 13. However, a sufficiently increased thrust of the sleeve and post relatively downwardly with respect to the bayonet mount will cause the sleeve surface to come into actual contact with the wall surface 14' of the mount and to remain in this final position as long as the excessive thrust continues. Consequently, the cushioning member 18, normally maintaining the slight clearance between the opposed surfaces of bayonet mount and post and sleeve, provides isolation of vehicle and impact vibrations except on occasions when actual contact occurs between the bayonet mount and the sleeve under conditions of excessive thrust.

To hold the post and sleeve down on the cushioning member 18 and to prevent any greater separation of the two portions of the mounting assembly or any momentary tendency to move relatively in opposite directions away from each other, a locking element is provided which consists of a bolt 21 extending transversely through the bayonet body and through opposite walls on the sleeve and bottom of the post. In the preferred form of the invention shown in FIGS. 1, 2 and 3 the ends of the bolt extend through holes 22 provided in opposite walls in sleeve 11 and registering holes or slots 23 in the bottom of the post 10 and the bolt extends through a slot 19 provided in the bayonet body 14. The bolt is firmly secured in place in the sleeve and post by means of the nut 24. The slot 19 in the bayonet body, as apparent from FIG. 1, is elongated downwardly in order to allow limited relative travel of the post and sleeve downwardly with respect to the bayonet mount. The slot 19 also is provided with a lining of rubber 20 or other suitable resilient cushioning material reducing the lateral width of the slot to approximately the diameter of the bolt 21 while allowing for limited relative downward movement of the bolt in the cushioned slot which would occur when the sleeve and bayonet members were forced into actual contact. The cushioning lining 20 in the bayonet slot 19 not only stabilizes the mount and aids in isolating lateral vibration and noise and impact loads, but also protects the bolt from vibratory wear.

The mounting illustrated in FIG. 4 is similar to that already described with the exception that this mounting has been adapted for use where the tubular canopy post is circular instead of square or rectangular in cross section. In this case a sleeve 26 is secured in the bottom of the circular post 25, the diameter of the cylindrical wall of the upper portion of the sleeve being approximately the same as the internal diameter of the post 25. This sleeve has an inside channel 27 of upwardly decreasing diameter, and the bayonet mount 28 in this case has a frusto-conical upwardly protruding body portion with a diameter similarly decreasing upwardly. The bayonet mount has an enlarged base 29 which is secured to a frame member 30 of the vehicle. A bolt 31, having its ends secured in the sleeve 26 and bottom of the post 25, extends through a slot 32 in the bayonet slot, which slot is elongated downwardly and has a cushioning lining 31.

While the bolt comprising the means for locking the two portions of the mounting assembly against separation has been previously described as having its ends firmly secured in the sleeve and post while extending through an elongated slot in the bayonet member, the same result is obtainable by having the bolt firmly secured in the bayonet member with its ends mounted in upwardly elongated slots in the walls of the sleeve and post. Such an arrangement is shown in FIG. 5 in which the central portion of the bolt 35 is firmly held in a hole extending transversely through the bayonet body 36. The ends of the bolt in this case extend through slots 37 and 38 in the walls of the sleeve 39 and post 40 respectively. These slots are similarly provided with cushioning linings 41. It will be noted that with this modification the bolt is normally at the bottom of the cushioned slots since any excessive downward pressure on the cushioning member 42 on which the sleeve rests will result in the ends of the bolt being positioned relatively upwardly with respect to the end slots.

The results obtained are the same with the shock cushioning mounting constructed and arranged in any of the forms mentioned. Thus, during normal operation the mounting assembly for each post of the canopy is free to absorb or dampen vibrations to prevent the causing of weld failures and fatigue in the canopy structure. In the event of a roll over of the vehicle with its mounted canopy, tensile loads become applied first to the two canopy posts in contact with the ground. Loads are transmitted to the canopy frame through the other two posts causing the mounts of the latter to be compressed and the bayonet members to be press fitted into their corresponding sleeves. Then, as the roll over of the vehicle and canopy continues, the mounting assemblies for all four canopy posts are compressed and become rigid. This rigidity enables lighter construction to be used for the canopy and consequenty a saving in the cost of manufacture.

Other modifications in construction of the shock cushioning mounting means would be possible without departing from the principle of the invention. For example, the sleeve member portion of the mounting means could be secured on the frame of the vehicle and the bayonet member, with its protruding body extending downward, secured to the bottom of the canopy post. The preferred constructions, however, are those which have been illustrated and described. It is not intended to limit the invention otherwise than as provided in the claims.

I claim:

1. Shock cusioning mounting means for a guard canopy post on the vehicle including a portion rigidly secured to the vehicle and a cooperating portion rigidly secured to the bottom of the canopy post, one of said portions constituting a bayonet member having a protruding body of uniformly decreasing cross-sectional area, the other said portions constituting a sleeve member of corresponding decreasing interior dimension forming a socket capable of receiving said bayonet body with a close fit, a cushioning element extending around on the larger end of said bayonet body and compressed by the opposed end of said sleeve, said element being of sufficient height and resiliency and so arranged as to maintain a slight all-around clearance between said bayonet body and the surrounding wall of said sleeve under compression produced by normal load conditions but enabling said bayonet body and said sleeve to be brought into final actual contact under increased load, and locking means on said bayonet body and on said sleeve preventing said bayonet body and said sleeve from any movement oppositely relatively with respect to each other sufficient to increase the clearance between said bayonet body and said sleeve beyond that normally caused by said cushioning element.

2. The combination set forth in claim 1 with said bayonet member portion secured to the vehicle and with said sleeve member portion secured in the bottom end of the canopy post, and with said locking means including a bolt extending transversely through said bayonet body and through opposite sides on said sleeve member and post.

3. The combination in claim 2 with the ends of said bolt of said locking means extending through and rigidly secured in the walls of said sleeve and of the canopy post and with said bayonet body provided with a transverse slot to accommodate said bolt, the vertical width of said slot being reater than the diameter of said bolt and said slot so positioned as to cause said bolt under normal conditions to engage the top of said slot.

4. The combination in claim 3 with said slot in said bayonet body having a lining of resilient material.

5. The combination in claim 2 with the middle portion of said bolt firmly secured in said bayonet body and with the ends of said bolt extending through vertically elongated slots in the walls of said sleeve and said post, said slots being so positioned as to cause the ends of said bolt under normal conditions to engage the bottoms of said slots.

6. The combination in claim 5 with said slots in said sleeve member and post having a lining of resilient material.

References Cited

UNITED STATES PATENTS

| | | | |
|---|---|---|---|
| 2,199,004 | 4/1940 | Lord | 287—85 |
| 2,658,747 | 11/1953 | Dath | 267—63X |
| 3,203,728 | 8/1965 | Wood | 296—102 |
| 3,353,852 | 11/1967 | Wood | 287—20 |
| 3,380,774 | 4/1968 | Brodersen et al. | 296—102 |

FOREIGN PATENTS 1,115,995  10/1961  Germany _____ 267—63

LEO FRIAGLIA, Primary Examiner

L. J. PAPERNER, Assistant Examiner

U.S. Cl. X.R.

267—1; 287—20, 85; 296—102